United States Patent [19]
Ouchi et al.

[11] Patent Number: 5,764,663
[45] Date of Patent: Jun. 9, 1998

[54] LASER APPARATUS

[75] Inventors: Kazumi Ouchi; Kazunobu Kojima, both of Aichi, Japan

[73] Assignee: Nidek Co., Ltd., Gamagori, Japan

[21] Appl. No.: 758,001

[22] Filed: Nov. 27, 1996

[30] Foreign Application Priority Data

Nov. 30, 1995 [JP] Japan ................. 7-337910

[51] Int. Cl.$^6$ ................................... H01S 3/10
[52] U.S. Cl. ................................... 372/22
[58] Field of Search ............... 372/21, 22; 359/326, 359/328

[56] References Cited

U.S. PATENT DOCUMENTS 5,646,764  7/1997  Moore et al. .................. 372/22

FOREIGN PATENT DOCUMENTS 47-125      1/1972   Japan .
2-261285   10/1990   Japan ................. H04N 9/12
3-11778     1/1991   Japan ................. H01S 3/094

Primary Examiner—Rodney B. Bovernick
Assistant Examiner—Robert E. Wise
Attorney, Agent, or Firm—Sughrue, Mion, Zinn, Macpeak & Seas, PLLC

[57] ABSTRACT

A laser apparatus for generating laser beams of predetermined wavelengths comprises a solid-state laser medium for generating a light beam having predetermined at least three fundamental wavelengths, at least three wavelength converters which respectively convert the light beam into harmonics corresponding to three primary colors of blue, green, and red, the wavelength-converter being circumferentially arranged, wavelength-converter holder for holding the wavelength converters, light blocking portions disposed between the wave length converters; rotating unit for rotating the wavelength-converter holder, thereby repeatedly positioning each of the wavelength converters and each of the light blocking portions on an optical axis of the solid-state laser medium, and a laser resonant optical system which resonates the light beams generated by the solid-state laser medium and outputs the harmonics converted by the wavelength converters.

10 Claims, 3 Drawing Sheets

LASER APPARATUS

BACKGROUND OF THE INVENTION

The invention relates to a laser apparatus for obtaining laser beams of the three primary colors which are to be applied to color display or the like.

Applications of laser beams of the three primary colors, i.e., blue, green, and red which are required for color display to image display and the like are conventionally studied by utilizing the monochromaticity of laser beams. It is known that the following lasers can be applied to color image display.

For example, green and blue laser beams are generated by an argon laser, and a red laser beam is generated by a krypton laser. When the three laser beams are subjected to intensity modulation processing and then synthesized with each other, natural colors can be reproduced. The laser beams are synthesized in accordance with a video signal from a camera or the like, and then projected onto a screen while being subjected to the scanning operation by a beam scanning apparatus and projected on a screen, thereby displaying an image.

In addition, a He-Cd (metal vapor) laser is known as a laser which can oscillate laser beams of the three primary colors by means of a single laser oscillating device. Oscillation beams of the laser are red beams having wavelengths of 635.5 nm and 636.0 nm, green beams having wavelengths of 533.7 nm and 537.8 nm, and a blue beam having a wavelength of 441.6 nm. When a wide-band resonance mirror is used, the laser simultaneously oscillates these beams of the three primary colors, so as to generate a white-light laser beam. From the white-light laser beam, laser beams of the three primary colors are separated, and taken out. The laser beams of the three primary colors are subjected to intensity modulation processing in accordance with a video signal from a camera or the like, and then synthesized with each other. The synthesized laser beam is subjected to the scanning operation by a beam scanning apparatus, thereby displaying a color image.

The former apparatus using argon and krypton lasers has problems in that a plurality of laser oscillating devices are required for obtaining laser beams of the three primary colors, and that these devices are gas lasers and hence it is difficult to reduce the size of the devices. There exist additional drawbacks such as that a larger electric power is required, but the output power level is not so high and the brightness of the obtained image is not so high.

The latter He-Cd laser has an advantage in that laser beams of the three primary colors can be obtained by a single device, but the laser output power level is very low (in the order of mW). Accordingly, it is impossible to obtain an image with high brightness, so that the applications of the laser are limited.

SUMMARY OF THE INVENTION

In view of the above-described prior art, an object of the invention is to provide a laser apparatus in which laser beams of the three primary colors can be simultaneously obtained at a high power by a single laser oscillator.

The invention is characterized in that the apparatus has the following configuration in order to attain the above-mentioned object.

In a laser apparatus which oscillates laser beams of predetermined wavelengths, the laser apparatus comprises a solid-state laser medium for generating a light beam having predetermined at least three fundamental wavelengths, at least three wavelength converters which respectively convert the light beam into harmonics corresponding to three primary colors of blue, green, and red, the wavelength-converter being circumferentially arranged, wavelength-converter holder for holding the wavelength converters, light blocking portions disposed between the wave length converters; rotating unit for rotating the wavelength-converter holder, thereby repeatedly positioning each of the wavelength converters and each of the light blocking portions on an optical axis of the solid-state laser medium, and a laser resonant optical system which resonates the light beams generated by the solid-state laser medium and outputs the harmonics converted by the wavelength converters.

In the laser apparatus, the laser resonant optical system comprises a total reflection mirror which totally reflects the light beams of the predetermined three fundamental wavelengths to a side opposite to a laser emitting end of the solid-state laser medium.

In the laser apparatus, the total reflection mirror comprises regions having characteristics of respectively reflecting the light beams of the predetermined three fundamental wavelengths, the region being on a same circumference, and rotation of the total reflection mirror is synchronized with rotation of the wavelength-converter holding plate.

In the laser resonant optical system of the laser apparatus, a first lens which converges the laser beams from the solid-state laser medium on each of the wavelength converters, and a second lens which recovers light which has passed through the wavelength converter into parallel light are disposed.

In each of the first and second lenses of the laser apparatus, anti-reflection coats are formed on a circumference, each of the anti-reflection coats respectively corresponding to characteristics of the converted wavelengths of the three wavelength converters and wavelengths of the three fundamental waves, and the first and second lenses are rotated in synchronization with the rotation of the wavelength-converter holding plate.

In the laser apparatus, the laser resonant optical system comprises: an output mirror having characteristics of transmitting light beams of harmonics respectively converted by the three wavelength converters, and of reflecting light beams of fundamental wavelengths; and a dichroic mirror having characteristics of reflecting light beams converted into harmonics, and of transmitting light beams of fundamental wavelengths, the dichroic mirror being disposed between the solid-state laser medium and the wavelength converters.

In each of the output mirror and the dichroic mirror of the apparatus, regions respectively having characteristics for the three wavelengths are formed on a circumference, and the output mirror and the dichroic mirror are rotated in synchronization with wavelength characteristics of the wavelength converters.

In the laser apparatus, the rotating means is a motor for high-speed rotation.

In the laser apparatus, the solid-state laser medium is potassium-gadolinium-tungstate which is doped with neodymium.

The laser apparatus is utilized in a display apparatus in which a projection liquid crystal display device or a reflecting projection image display device is used.

DETAILED DESCRIPTION OF THE PREFERRED EMBODIMENTS

Figure 1:
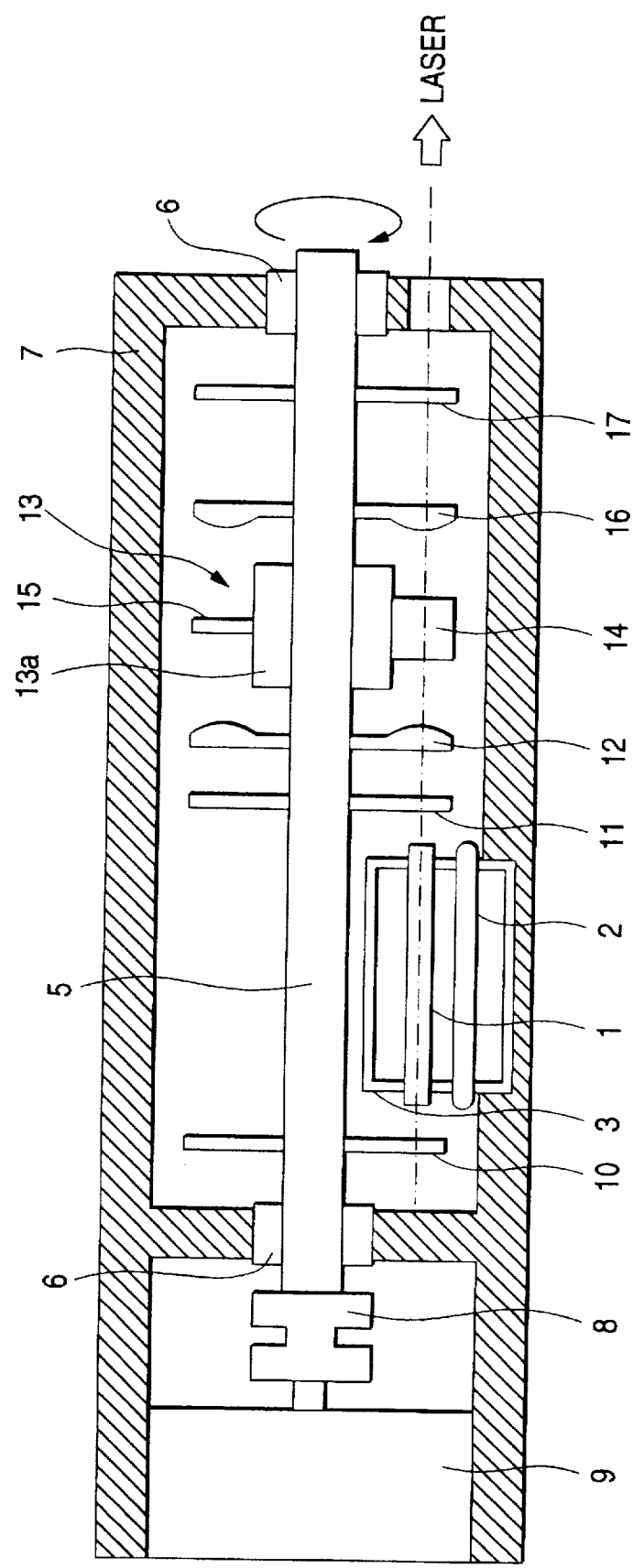
FIG. 1 is a diagram schematically showing the configuration of a laser apparatus of an embodiment.

Hereinafter, an embodiment of the invention will be described with reference to the accompanying drawings. FIG. 1 is a diagram schematically showing the configuration of a laser apparatus of the embodiment.

The reference numeral 1 designates an Nd:KGW (Potassium Gadolinium Tungstate) rod which is a solid-state laser medium. The Nd:KGW rod 1 can emit light of a plurality of oscillation beams. When light beams of fundamental wavelengths of 970 nm, 1,067 nm, and 1,320 nm among the oscillation beams are converted into the second harmonics, a blue laser beam of 485 nm, a green laser beam of 533 nm, and a red laser beam of 660 nm are obtained. The reference numeral 2 designates an excitation light source such as a flash lamp which supplies an energy for exciting the Nd:KGW rod 1. The excitation light source 2 and the Nd:KGW rod 1 are fixed to and held by a rod housing 3. In the rod housing 3, a converging type reflection mirror having an elliptical shape is formed in order to efficiently irradiate the Nd:KGW rod 1 with the exciting light from the excitation light source 2. Cooling water is circulated in the rod housing 3 by a cooling mechanism which is not shown, so as to cool the rod 1 and the excitation light source 2.

Figure 2:
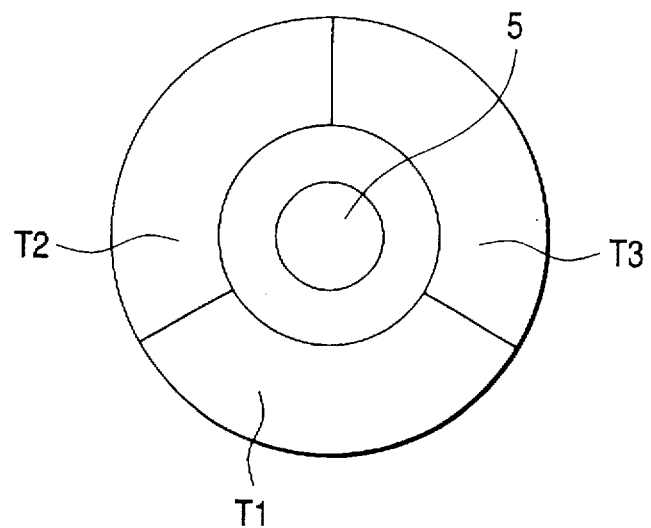
FIG. 2 is a diagram showing mirror regions of a total reflection mirror.

The following resonant optical system is formed in an axial direction of the Nd:KGW rod 1. The reference numeral 10 designates a disk shaped total reflection mirror. As shown in FIG. 2, the total reflection mirror 10 has three mirror regions T1, T2, and T3 which are equally divided the mirror and arranged on the same circumference. The mirror regions totally reflect the light beams having fundamental wavelengths of 970 nm, 1,067 nm, and 1,320 nm generated by the Nd:KGW rod 1, respectively.

The reference numeral 11 designates a disk shaped dichroic mirror. In the same manner as the total reflection mirror 10, three regions which are obtained by equally dividing the mirror and arranged on the same circumference transmit the light beams having fundamental wavelengths of 970 nm, 1,067 nm, and 1,320 nm from the Nd:KGW rod 1, respectively. These regions have characteristics of reflecting the second harmonics having wavelengths of 485 nm, 533 nm, and 660 nm converted from the light beams having the fundamental wavelengths by nonlinear crystals which will be described later, respectively.

The reference numeral 12 designates a first ring shaped planocylindrical lens. Anti-reflection coats respectively having characteristics of preventing the reflection of a beam of 970 nm and its second harmonic of 485 nm, a beam of 1,067 nm and its second harmonic of 533 nm, or a beam of 1,320 nm and its second harmonic of 485 nm are applied to three regions which are equally divided the lens and arranged on the same circumference, respectively. The first ring shaped planocylindrical lens 12 converges the light from the side of the Nd:KGW rod 1 on the nonlinear crystals 14 which will be described later, in order to increase the conversion efficiency of the nonlinear crystals 14.

Figure 3:
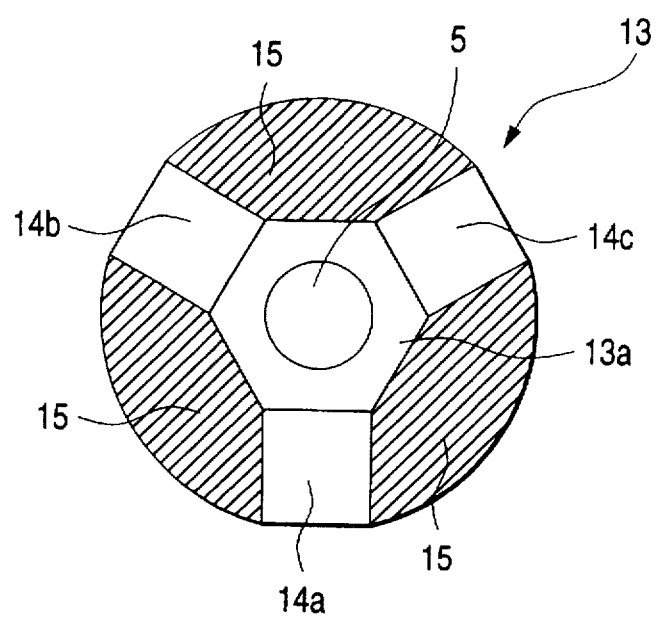
FIG. 3 is a diagram illustrating a crystal mounting circular plate.

The reference numeral 13 designates a crystal mounting circular plate on which the nonlinear crystals 14 which respectively convert light beams having fundamental wavelengths from the Nd:KGW rod 1 into the second harmonics are mounted. As shown in FIG. 3, nonlinear crystals 14a, 14b, and 14c are fixed to a mounting block 13a with equal distances so as to equally divide the circumference of the crystal mounting circular plate 13 into three portions. In the nonlinear crystals 14a, 14b, and 14c, phase matching of crystal is attained in accordance with respective wavelengths, in order to convert light beams having fundamental wavelengths of 970 nm, 1,067 nm, and 1,320 nm into their second harmonics having wavelengths of 485 nm, 533 nm, and 660 nm, respectively. Shielding portions 15 which block light are disposed between the crystals. The nonlinear crystals 14 mounted on the crystal mounting circular plate 13 are placed in the vicinity of the back focal point of the first ring shaped planocylindrical lens 12.

The reference numeral 16 designates a second ring shaped planocylindrical lens which has the same characteristics as those of the first ring shaped planocylindrical lens 12, but which are arranged in the opposite direction. The nonlinear crystals 14 are placed in the vicinity of the front focal point of the second ring shaped planocylindrical lens.

The reference numeral 17 designates a disk shaped output mirror. The output mirror 17 has three regions which are equally divided the mirror and on one and the same circumference. The regions have characteristics of totally reflecting light beams of 970 nm, 1,067 nm, and 1,320 nm and transmitting their second harmonics of 485 nm, 533 nm, and 660 nm, respectively.

The resonant optical system constituted by these components 10 to 17 is attached to a rotation shaft 5 so that their three equally divided regions correspond in wavelength to each other. The regions are caused by the rotation of the rotation shaft 5 to be positioned on the laser oscillation optical axis L of the Nd:KGW rod 1 so that the respective fundamental waves are converted into the second harmonics. When the rotation shaft 5 has a relatively larger diameter, it is possible to suppress the axial deviation of the resonant optical system. Both ends of the rotation shaft 5 are rotatably held by a resonator housing 7 via bearings 6 such as air bearings. One end of the rotation shaft is connected to the shaft of a motor 9 by means of a flexible coupling 8. The flexible coupling 8 absorbs the eccentricity between the motor shaft and the rotation shaft 5. For example, a motor for high-speed rotation which can perform 40,000 rpm (revolutions per minute) may be used as the motor 9.

The total reflection mirror 10, the dichroic mirror 11, the ring shaped planocylindrical lenses 12 and 16, and the output mirror 17 in the illustrated laser-resonant optical system are divided into respective regions in order to simplify the coat construction, in view of the characteristics such as reflection for the respective wavelengths. Alternatively, if the mirrors and the lenses can cover the reflection (and transmission) characteristics in a wide band, it is not always necessary to divide them into plural regions. In this case, optical components which are not divided in accordance with the wavelength characteristics are not rotated and can be fixed to the resonator housing 7, so that the rotation mechanism can be simplified.

The operation of the thus configured apparatus will be described.

The excitation light source 2 is powered by a power supply unit which is not shown. The Nd:KGW rod 1 is irradiated with the exciting light from the excitation light source 2, so as to be excited. The electric power is supplied also to the motor 9, so as to rotate the laser resonant optical system at a high speed. During a period when one of the shielding portions 15 of the crystal mounting circular plate 13 is positioned on the optical axis L of the Nd:KGW rod 1 by the rotation of the laser resonant optical system, the shielding portion 15 functions as a shutter, and the exciting energy is accumulated in the resonator. By the rotation of the crystal mounting circular plate 13, for example, the nonlinear crystal 14a which converts the fundamental wavelength of 970 nm into 485 nm is positioned on the optical axis L (also in the other optical systems, the regions having corresponding wavelength relationships are positioned on the optical axis L). At this time, a light beam which has the fundamental wavelength of 970 nm and which is reflected from the total reflection mirror 10 is transmitted through the dichroic mirror 11, the energy density of the light beam is increased by the first ring shaped planocylindrical lens 12, and thereafter the light beam can be transmitted through the nonlinear crystal 14a. When the light beam of 970 nm is transmitted through the nonlinear crystal 14a, part of the light beam is converted into the second harmonic of 485 nm. The light beam transmitted through the nonlinear crystal 14a is shaped into a light beam in the optical axis direction by the second ring shaped planocylindrical lens 16. Thereafter, the light beam having the fundamental wavelength of 970 nm is reflected from the output mirror 17, but the converted light beam of 485 nm can be transmitted through the output mirror 17. Accordingly, the laser oscillator oscillates a blue laser beam of 485 nm. When the region of the crystal mounting circular plate 13 positioned on the optical axis L is changed from the shielding portion 15 to the nonlinear crystal 14a, the energy accumulated in the resonator causes stimulated emission in a very short time. As a result, the laser beam of 485 nm is generated. That is, the crystal mounting circular plate 13 functions as a so-called Q switch, so that the generated laser beam is obtained as a high-power pulse laser beam having a peak output level in the order of kW.

The light beam of 970 nm which is not converted by the nonlinear crystal 14a and passes therethrough is reflected from the output mirror 17 and travels back through the optical system. The nonlinear crystal 14a again converts part of the reflected light beam into the second harmonic of 485 nm. The light beam of 485 nm which travels back through the optical system is reflected from the dichroic mirror 11. During a period when the nonlinear crystal 14a is positioned on the optical axis, the reflected light beam passes through the crystal. Then, the light beam passes through the output mirror 17 and is output as a blue laser beam. Thus, the laser output power can be further increased.

When the resonant optical system is further rotated, the shielding portion 15 is positioned on the optical axis L, in place of the nonlinear crystal 14a. Thereafter, for example, the nonlinear crystal 14b which converts a light beam having the fundamental wavelength of 1,067 nm into 533 nm is positioned on the optical axis L (also in the other optical systems, the regions having corresponding wavelength relationships are positioned on the optical axis L), a high-power green pulse laser beam of 533 nm is generated, in the same way as the case of the above-described laser beam of 485 nm (blue). Similarly, when the nonlinear crystal 14c which converts the fundamental wavelength of 1,320 nm into 660 nm is positioned on the optical axis L, a high-power red pulse laser beam of 660 nm is generated.

The thus generated laser beams of blue, green, and red pulse, i.e., the three primary colors are sequentially generated at high repetition by driving the resonant optical system to rotate by the high-speed rotation of the motor 9. The repetitive number of each of the laser beams which are repetitively generated is determined by the rotation number of the resonant optical system, i.e., the rotation number of the motor 9. In the case where a motor which rotates 40,000 times per minute is used, laser beams of about 666 Hz can be obtained. In the embodiment, since the rotation of the laser resonant optical system is performed by coupling the rotation shaft 5 to the shaft of the motor 9, the rotation number of the motor 9 is the same as that of the optical system. Alternatively, pulleys or the like may be attached to the rotation shaft 5 and the shaft of the motor 9, respectively, and the rotation may be transmitted by a timing belt or the like so as to increase the rotation ratio. In the alternative, a higher rotation speed can be realized, and pulse laser beams with an extremely high repetition number can be obtained. As the rotation driving means, an air turbine may be used in place of the motor 9.

As described above, the laser apparatus of the invention can obtain laser beams of the three primary colors at a high repetition number and a high power. When well-known processing such as that of applying intensity modulation to the laser beams is performed, colors in the entire color region can be represented with high brightness.

Next, embodiments of an apparatus in which the laser apparatus of the invention is utilized for image display will be described with reference to FIGS. 4 and 5.

Figure 4:
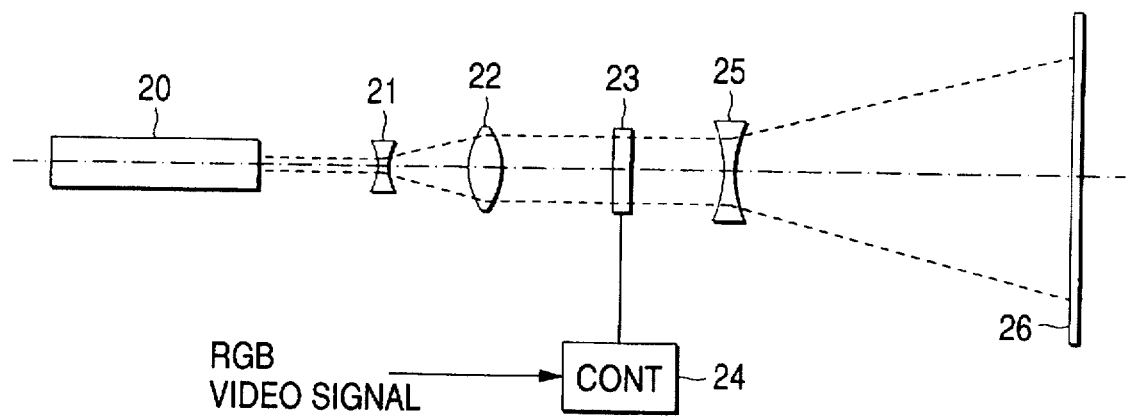
FIG. 4 is a diagram showing an example of an apparatus in which the laser apparatus of the embodiment is utilized for image display.

In an apparatus of FIG. 4, luminous fluxes of pulse laser beams of red, blue, and green which are repetitively generated by a laser apparatus 20 are expanded by an expander lens 21, and then collimated by a collimator lens 22. The collimated laser luminous fluxes of the respective colors illuminate the whole of matrix liquid crystal devices disposed in a projection liquid crystal display apparatus 23. A control unit 24 is connected to the liquid crystal display apparatus 23. The control unit 24 drives the liquid crystal display apparatus 23 based on an RGB video signal from a video signal transmitting apparatus or the like, and controls an image displayed by the matrix liquid crystal devices. The full-color reproduction in each device is performed, for example, in the following manner.

Laser beams of respective colors are repetitively generated at a predetermined frequency, and sequentially illuminate the liquid crystal devices. At this time, in synchronization with the laser oscillation pulses of respective colors from the laser apparatus 20, the optical transmittance of each device (of each pixel) is changed in accordance with the color component information and the brightness information obtained from the RGB video signal (preferably, intensities of the output laser beams of respective colors are monitored, and the control is performed by compensation processing based on the intensity information for each color). Since the time period when one series of pulse laser beams of red, blue, and green passes through is extremely short, the eyes of a human being recognize them as light of a color which is produced by synthesizing the color components and the brightnesses with each other. Accordingly, full-color representation can be performed for each liquid crystal device, and light of a full-color image is constituted by the whole of the matrix type liquid crystal devices.

The luminous fluxes which pass through the liquid crystal display apparatus 23 are magnified by a magnifying projection lens 25, and then projected on a screen 26 so that an image corresponding to the RGB video signal is displayed.

Figure 5:
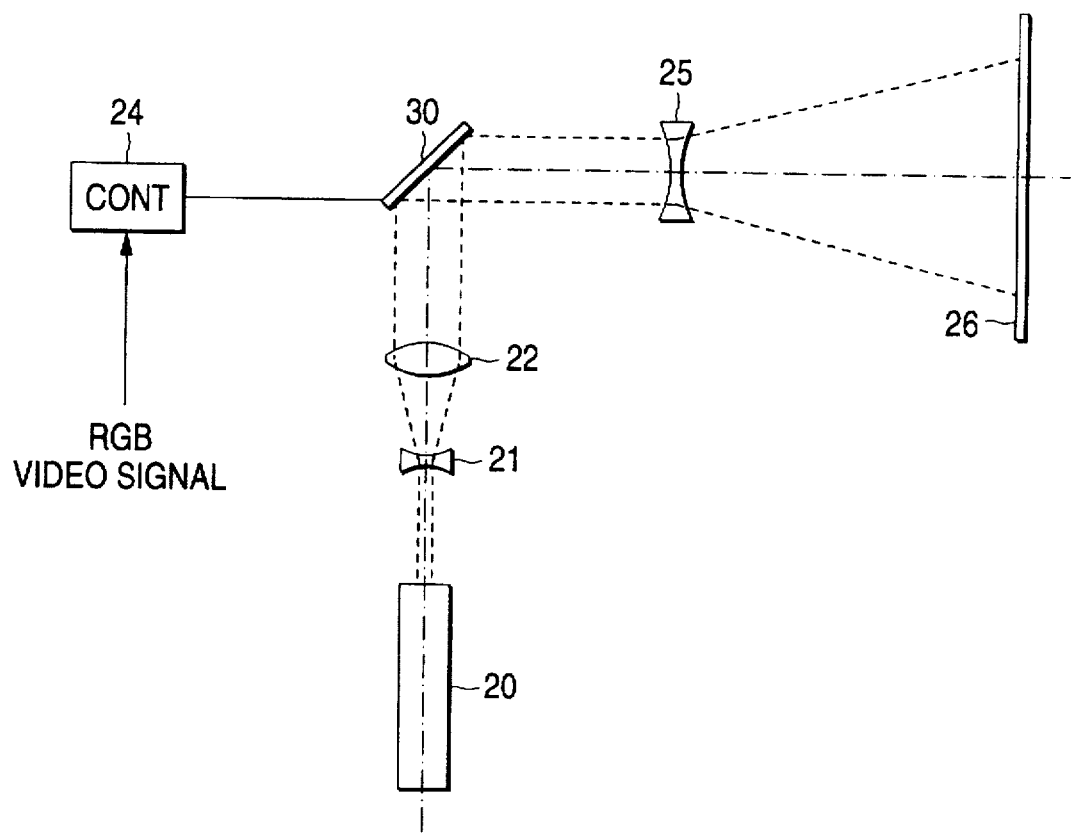
FIG. 5 is a diagram showing another example of an apparatus in which the laser apparatus of the embodiment is utilized for image display.

FIG. 5 is a diagram showing another embodiment of an image display apparatus (similar components as those of the apparatus of FIG. 4 are designated by the same reference numerals). The reference numeral 30 designates an image display apparatus of a reflecting projection type (an apparatus of a digital micro mirror device (DMD) manufactured by Texas Instruments, Inc. of the U.S.A. can be used). The image display apparatus 30 has a structure in which several hundred thousands of minute mirrors are integrated into one chip, and a video image is projected by individually controlling the reflection angles of the mirrors. One mirror functions as one pixel. Two diagonal ends of each mirror are supported by posts. The direction of the mirror is changed by a predetermined angle in accordance with a transmitted control signal, so that the direction of reflected light is changed in an extremely short time. This causes the amount of light (brightness) which is reflected in a fixed direction direction toward the screen), to be adjusted.

When the image display apparatus 30 is used in place of the liquid crystal display apparatus 23 shown in FIG. 4, an image can be displayed on the screen. Since the image display apparatus 30 uses mirrors, the utilization efficiency of light is high. Therefore, it is possible to display an image with higher brightness than the projection type liquid crystal display apparatus.

In the above, embodiments in which an image is displayed on a two-dimensional plane have been described. When the laser apparatus of the invention is utilized as a light source of a holography for three-dimensional display, it is possible to constitute a large image with high brightness which cannot be realized by the prior art.

As described above, according to the invention, laser beams of the three primary colors can be obtained at a high power by a single laser oscillator. When the laser beams of the three primary colors are respectively modulated, therefore, the full color region can be represented, and it is possible to realize an image display with extremely high brightness.

What is claimed is:

1. A laser apparatus for generating laser beams of predetermined wavelengths, comprising:

a solid-state laser medium for generating a light beam having predetermined at least three fundamental wavelengths;

at least three wavelength converters which respectively convert said light beam into harmonics corresponding to three primary colors of blue, green, and red, said wavelength-converter being circumferentially arranged;

wavelength-converter holding means for holding said wavelength converters;

light blocking portions disposed between said wavelength converters;

rotating means for rotating said wavelength-converter holding means, thereby repeatedly positioning each of said wavelength converters and each of said light blocking portions on an optical axis of said solid-state laser medium; and a laser resonant optical system which resonates said light beams generated by said solid-state laser medium and outputs the harmonics converted by said wavelength converters.

2. A laser apparatus according to claim 1, wherein said laser resonant optical system comprises a total reflection mirror which totally reflects the light beams having the predetermined fundamental wavelengths, said total reflection mirror being positioned at an opposite side to a laser emitting end of said solid-state laser medium.

3. A laser apparatus according to claim 2, wherein said total reflection mirror comprises regions having characteristics of respectively reflecting the light beams of the predetermined fundamental wavelengths, said region being circumferentially arranged, and said total reflection mirror is rotated in synchronization with the rotation of said wavelength-converter holding means.

4. A laser apparatus according to claim 1, wherein said laser resonant optical system comprises a first lens which converges said light beams from said solid-state laser medium on each of said wavelength converters, and a second lens which recovers light which has passed through said wavelength converter into parallel light are disposed.

5. A laser apparatus according to claim 4, wherein each of said first and second lenses includes anti-reflection coats formed on its circumference, each said anti-reflection coats respectively corresponding to characteristics of the converted wavelengths of said three wavelength converters and the fundamental wavelengths, and said first and second lenses being rotated in synchronization with the rotation of said wavelength-converter holding means.

6. A laser apparatus according to claim 1, wherein said laser resonant optical system comprises: an output mirror having characteristics of transmitting light beams of harmonics respectively converted by said three wavelength converters, and of reflecting light beams of fundamental wavelengths; and a dichroic mirror having characteristics of reflecting light beams converted into harmonics, and of transmitting light beams of fundamental wavelengths, said dichroic mirror being disposed between said solid-state laser medium and said wavelength converters.

7. A laser apparatus according to claim 6, wherein, each of said output mirror and said dichroic mirror includes regions respectively having characteristics for the three wavelengths are formed on a circumference, and said output mirror and said dichroic mirror are rotated in synchronization with the rotation of said wavelength-converter holding means.

8. A laser apparatus according to claim 1, wherein said rotating means is a motor for high-speed rotation.

9. A laser apparatus according to claim 1, wherein said solid-state laser medium is potassium-gadolinium-tungstate which is doped with neodymium.

10. A laser apparatus according to claim 1, wherein said laser apparatus is utilized in a display apparatus in which a projection liquid crystal display device or a reflecting projection image display device is used.

* * * * *